United States Patent
Ohtani et al.

(10) Patent No.: US 6,671,321 B1
(45) Date of Patent: Dec. 30, 2003

(54) MOTION VECTOR DETECTION DEVICE AND MOTION VECTOR DETECTION METHOD

(75) Inventors: Akihiko Ohtani, Osaka (JP); Takaaki Shingo, Osaka (JP)

(73) Assignee: Mastsushita Electric Industrial Co., Ltd., Osaka (JP)

(*) Notice: Subject to any disclaimer, the term of this patent is extended or adjusted under 35 U.S.C. 154(b) by 642 days.

(21) Appl. No.: 09/653,483

(22) Filed: Aug. 31, 2000

(30) Foreign Application Priority Data

Aug. 31, 1999 (JP) .......................................... 11-244717

(51) Int. Cl.[7] .......................... H04B 1/66; G06K 9/46; H04N 9/64; H04N 7/12
(52) U.S. Cl. ................ 375/240.16; 382/236; 348/699; 348/416.1
(58) Field of Search ..................... 375/240.16, 240.01, 375/240.24, 240.12, 240.23; 348/402.1, 416.1, 169, 699, 700; 382/236, 238, 239

(56) References Cited

U.S. PATENT DOCUMENTS

| 5,502,492 | A | * | 3/1996 | Jung .................... 375/240.14 |
| 5,757,422 | A | * | 5/1998 | Matsumura ................. 348/169 |
| 6,002,428 | A | * | 12/1999 | Matsumura et al. ........ 348/169 |
| 6,169,766 | B1 | * | 1/2001 | Aoki et al. ............ 375/240.16 |
| 6,611,559 | B1 | * | 8/2003 | Shingo et al. .......... 375/240.16 |

FOREIGN PATENT DOCUMENTS

| JP | 04-049788 | 2/1992 |
| JP | 08-084345 | 3/1996 |
| JP | 9-224249 | 8/1997 |
| JP | 11-075192 | 3/1999 |

OTHER PUBLICATIONS

Copy of Office Action issued in corresponding Japanese application dated Dec. 3, 2002.

* cited by examiner

Primary Examiner—Gims Philippe
(74) Attorney, Agent, or Firm—Snell & Wilmer, LLP

(57) ABSTRACT

A motion vector detection device of the present invention includes: a parameter setting section having parameters relating to N (N is a natural number equal to or greater than 2) search regions obtained by dividing at least a portion of an entire search region in a search frame; a motion vector detection section for calculating an evaluation value which indicates a degree of correlation between an encoded object block in an object frame and a candidate block in one of the N search regions and for calculating a motion vector based on the evaluation value; a result storage section for storing the motion vector and the evaluation value calculated by the motion vector detection section; and a control section for controlling the motion vector detection section to calculate motion vectors and evaluation values for M ($1 \leq M \leq N$) different ones of the N search regions until a predetermined condition is satisfied, for receiving the motion vectors and the evaluation values from the result storage section, and for determining the motion vector for the encoded object block.

39 Claims, 13 Drawing Sheets

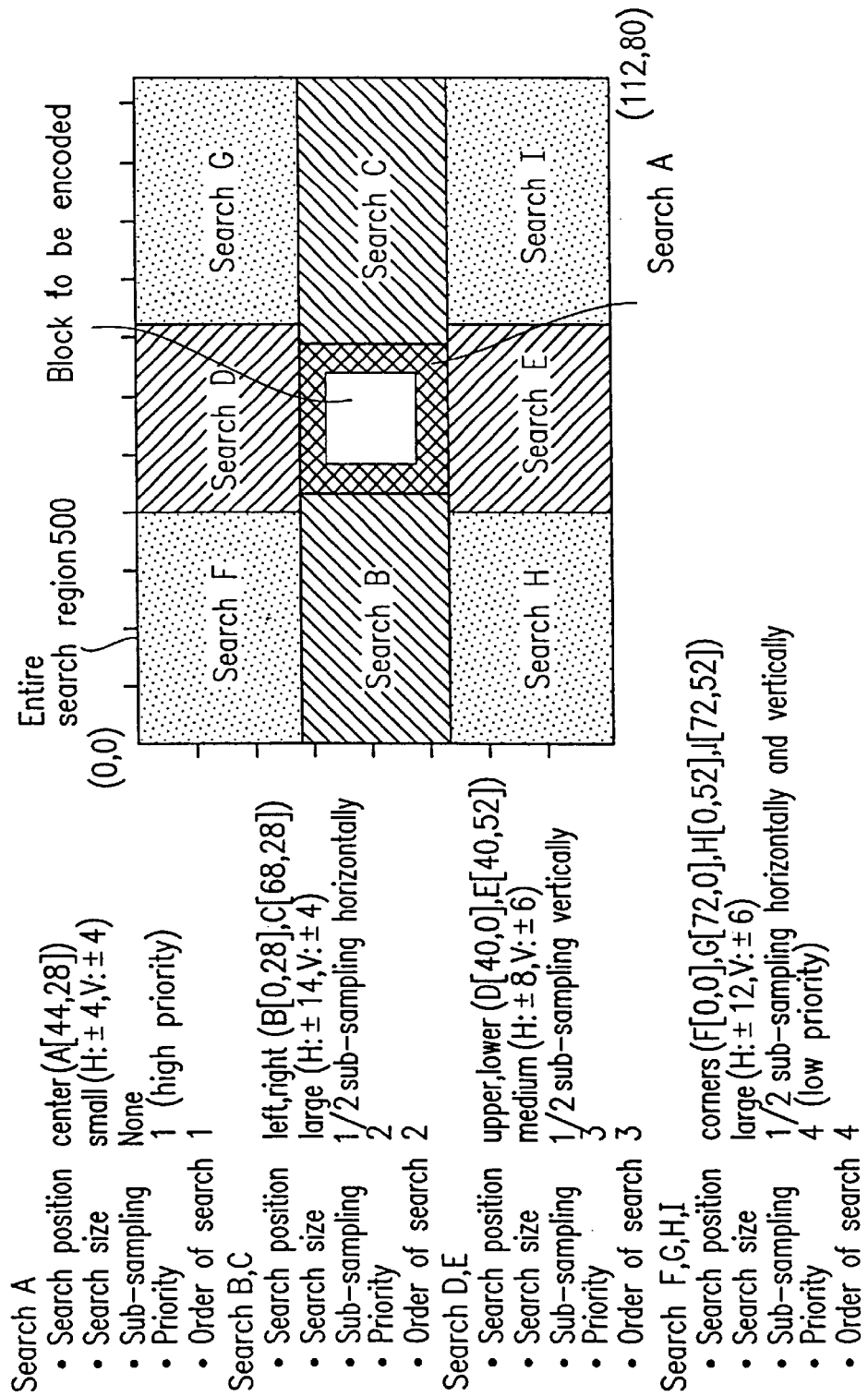

MOTION VECTOR DETECTION DEVICE AND MOTION VECTOR DETECTION METHOD

BACKGROUND OF THE INVENTION

1. Field of the Invention

The present invention relates to a motion vector detection device used in a motion compensation/estimation encoding method, which is a type of method used for compressing/encoding digital motion picture data.

2. Description of the Related Art

A motion picture encoding method uses information (motion vector) which indicates the movement of a portion of the current image from the previous image so as to reduce the redundancy in time and quantity of data. The block matching method is a method for extracting such a motion vector.

FIG. 7 illustrates the principle of the block matching method. The image of an object frame 702 to be encoded is compared with the image of a search frame 701 so as to extract a block (best match block 706) from a search region 704 in the search frame 701 that has an evaluation value indicating the highest degree of similarity to an encoded object block 703 (the term "encoded object block" as used herein refers to a block to be encoded, not a block which has already been encoded) in the object frame 702, thereby detecting a motion vector 705 therebetween. The block matching method has been widely used for motion compensation/estimation in image compression/encoding methods.

FIG. 8 illustrates an enlarged version of the search frame 701 shown in FIG. 7. In the block matching method, the degree of correlation is calculated between the single encoded object block 703 and each of a plurality of candidate blocks 707 within the search region 704 in the search frame 701 (the plurality of candidate blocks 707 are selected by scanning the search region 704 vertically or horizontally). Then, one of the candidate blocks 707 having the highest degree of correlation with respect to the encoded object block 703 is selected as the best match block 706, and the motion vector 705 is detected which extends from the position of the block 703 to the best match block 706.

Some conventional motion vector detection devices which are based on the block matching method aim to reduce the amount of hardware resource needed.

Japanese Laid-Open Publication No. 6-141304, for example, discloses a technique in which M×N calculation units are arranged in M rows and N columns, each calculation unit including a pixel storage register, a multiplexer and a differential absolute value calculator. Where the reference block size is M×N pixels, a candidate vector having the highest degree of correlation with respect to the encoded object block is determined for each of M×N candidate blocks. However, with this conventional technique, the degree of correlation can be calculated only for the M×N candidate blocks, and it is difficult to increase the number of candidate blocks by expanding the search region in order to select a candidate block which may have a higher degree of correlation with respect to encoded object block.

Japanese Laid-Open Publication No. 9-224249, for example, discloses a motion vector detection device 900 as illustrated in FIG. 9. The motion vector detection device 900 includes two different motion vector detection circuits for detecting two vectors for a given encoded object block, i.e., a first motion vector detection circuit 915 for performing a motion vector detection operation over a relatively large detection region but with a relatively coarse resolution and a second motion vector detection circuit 916 for performing a motion vector detection operation over a relatively small detection region but with a relatively fine resolution. The motion vector detection device 900 is arranged so that the relatively large detection region of the first motion vector detection circuit 915 includes the relatively small detection region of the second motion vector detection circuit 916. Thus, a motion vector for a relatively fast movement is detected by the first motion vector detection circuit 915 having the relatively large detection region, whereas a motion vector for a relatively slow movement is detected by both of the two motion vector detection circuits (i.e., by the first motion vector detection circuit 915 having the relatively large detection region and by the second motion vector detection circuit 916 having the relatively small detection region). The values of correlation detected by the respective detectors- are compared with each other by a comparator 917, thereby increasing the precision with which a motion vector for a relatively slow movement is detected.

However, this conventional technique requires the two different motion vector detection circuits 915 and 916, thereby increasing the size and complexity of the entire circuit.

As described above, conventional motion vector detection devices had a limited search region. One conventional solution to this problem was the motion vector detection device 900 illustrated in FIG. 9 which includes two different motion vector detection circuits, one for a relatively fine resolution and another for a relatively coarse resolution, in order to expand the search region.

However, the motion vector detection device 900 requires the two different motion vector detection circuits 915 and 916, thereby increasing the scale of the entire circuit. The increase in the circuit scale may present a potentially serious problem particularly for motion vector detection based on the block matching method, in which the optimal position (the optimal motion vector) is detected by accumulating the difference between each pixel in the encoded object block and the corresponding pixel in each of a plurality of candidate blocks over an entire search region.

Moreover, it is expected that there will be a demand for a technique for detecting a motion of an image over an even larger search region in order to meet the existing demand for a higher definition and a higher image quality along with the increase in the size of the display screen.

SUMMARY OF THE INVENTION

In order to solve the above-described problems, the present invention provides a motion vector detection device in which a large search region is divided into a plurality of search regions and in which a motion vector with respect to one encoded object block is detected a plurality of times for each of the plurality of search regions. More specifically, the present invention provides a motion vector detection device capable of precisely detecting a motion vector for high image quality applications without substantially increasing the circuit scale, in which a single motion vector detection section may include a section for setting a plurality of parameters for a plurality of search regions, respectively, and a section for storing a plurality of motion vector detection results respectively corresponding to the search regions.

According to one aspect of this invention, there is provided a motion vector detection device, including: a parameter setting section having parameters relating to N (N is a natural number equal to or greater than 2) search regions obtained by dividing at least a portion of an entire search region in a search frame; a motion vector detection section for calculating an evaluation value which indicates a degree of correlation between an encoded object block in an object frame and a candidate block in one of the N search regions and for calculating a motion vector based on the evaluation value; a result storage section for storing the motion vector and the evaluation value calculated by the motion vector detection section; and a control section for controlling the motion vector detection section to calculate motion vectors and evaluation values for M ($1 \leq M \leq N$) different ones of the N search regions until a predetermined condition is satisfied, for receiving the motion vectors and the evaluation values from the result storage section, and for determining the motion vector for the encoded object block. Thus, it is possible to precisely detect a motion vector over a large search region despite a small circuit scale.

In one embodiment of the invention, the control section inputs parameters relating to the N search regions to the parameter setting section.

In one embodiment of the invention, M is equal to N.

In one embodiment of the invention, the result storage section stores N motion vectors and N evaluation values and then outputs the evaluation values and the motion vectors to the control section.

In one embodiment of the invention, the parameters relating to each search region include search position which indicates a position of a search region.

In one embodiment of the invention, the parameters relating to each search region include search size which indicates a size of a search region.

In one embodiment of the invention, the parameters relating to each search region include sub-sampling which indicates a degree and a direction of decimation in the search region.

In one embodiment of the invention, the parameters relating to each search region include a priority which indicates a predetermined value to be added to or multiplied by the evaluation value.

In one embodiment of the invention, a search region horizontally shifted from a center of the entire search region has a priority higher than that of a search region vertically shifted from the center of the entire search region.

In one embodiment of the invention, the parameters relating to each search region include order of search which indicates an order in which the calculation of the motion vector and the evaluation value is performed.

In one embodiment of the invention, a search region horizontally shifted from a center of the entire search region has an order of search higher than that of a search region vertically shifted from the center of the entire search region.

In one embodiment of the invention, the parameters relating to each search region include at least two of search position, search size, sub-sampling, priority and order of search.

In one embodiment of the invention, the predetermined condition is that the evaluation value being smaller than a predetermined value which the control section has.

In one embodiment of the invention, the predetermined condition is limited by a predetermined amount of time.

In one embodiment of the invention, N is 2.

In one embodiment of the invention, N is 3.

In one embodiment of the invention, the at least a portion of the entire search region is divided only along the vertical direction.

In one embodiment of the invention, the at least a portion of the entire search region is divided only along the horizontal direction.

In one embodiment of the invention, the at least a portion of the entire search region is divided into elliptical search regions.

In one embodiment of the invention, each of the elliptical search regions is longer in the horizontal direction than in the vertical direction.

In one embodiment of the invention, the at least a portion of the entire search region is divided into rectangular search regions.

In one embodiment of the invention, the N search regions are such that no candidate block included in one of the N search regions has a complete overlap with another candidate block which is included in another one of the N search regions.

In one embodiment of the invention, at least two of the N search regions have different search sizes.

In one embodiment of the invention, at least two of the N search regions have different sizes, and a search region having a larger size surrounds a search region having a smaller size.

In one embodiment of the invention, one of the N search regions including a center of the entire search region has the smallest size.

In one embodiment of the invention, one or more of the N search regions along a periphery of the entire search region has the largest size.

In one embodiment of the invention, the at least a portion of the entire search region is rectangular, and one or more of the N search regions at corners of the at least a portion of the entire search region has the largest size.

In one embodiment of the invention, at least two of the N search regions have different priorities.

In one embodiment of the invention, one of the N search regions including a center of the entire search region has the lowest priority.

In one embodiment of the invention, one or more of the N search regions along a periphery of the entire search region has the highest priority.

In one embodiment of the invention, the at least a portion of the entire search region is rectangular, and one or more of the N search regions at corners of the at least a portion of the entire search region has the highest priority.

In one embodiment of the invention, at least two of the N search regions have different sub-sampling parameters.

In one embodiment of the invention, a search region vertically shifted from a center of the entire search region is sub-sampled in the vertical direction.

In one embodiment of the invention, a search region horizontally shifted from a center of the entire search region is sub-sampled in the horizontal direction.

In one embodiment of the invention, one or more of the N search regions along a periphery of the entire search region has the largest sub-sampling parameter.

In one embodiment of the invention, the at least a portion of the entire search region is rectangular, and one or more of the N search regions at corners of the at least a portion of the entire search region has the largest sub-sampling parameter.

According to another aspect of this invention, there is provided a motion vector detection method, including: an input step of inputting parameters relating to N (N is a natural number equal to or greater than 2) search regions obtained by dividing at least a portion of an entire search region in a search frame to a motion vector detection section; a calculation step of calculating an evaluation value which indicates a degree of correlation between an encoded object block in an object frame and a candidate block in one of the N search regions based on the parameters of the one of the N search regions, and calculating a motion vector based on the evaluation value; and a determination step of determining whether a predetermined condition is satisfied based on the calculated evaluation values and motion vectors.

In one embodiment of the invention, the motion vector detection method further includes the step of terminating the motion vector calculation when the predetermined condition is satisfied.

In one embodiment of the invention, the motion vector detection method further includes the step of repeating the input step and the calculation step when the predetermined condition is not satisfied.

Thus, the invention described herein makes possible the advantage of providing a motion vector detection device capable of detecting a motion vector with a high precision to realize a high image quality without increasing the circuit scale.

This and other advantages of the present invention will become apparent to those skilled in the art upon reading and understanding the following detailed description with reference to the accompanying figures.

BRIEF DESCRIPTION OF THE DRAWINGS

FIG. 5A illustrates an alternative example of how an entire search region is divided into smaller search regions according to the present invention;

DESCRIPTION OF THE PREFERRED EMBODIMENTS

Various embodiments of the present invention will now be described with reference to the accompanying drawings.

Embodiment 1

Figure 1A:
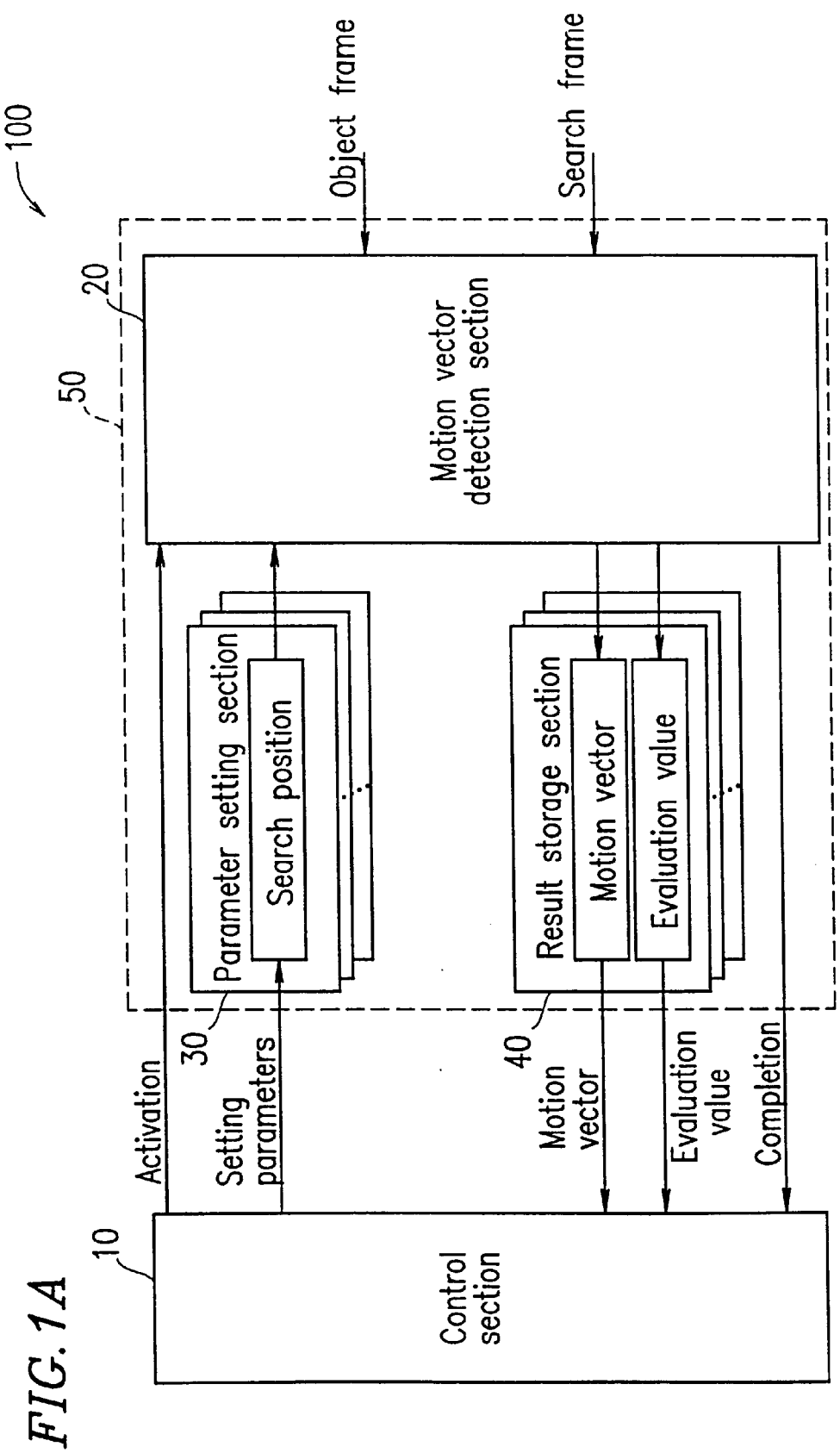
FIG. 1A is a schematic diagram illustrating a motion vector detection device of the present invention.

FIG. 1A illustrates a configuration of a motion vector detection device 100 according to Embodiment 1 of the present invention.

The motion vector detection device 100 includes a control section 10, a motion vector detection section 20, a parameter setting section 30 and a result storage section 40. The control section 10 inputs search region setting parameters to the parameter setting section 30 and activates the motion vector detection section 20. The respective setting parameters (search positions in the present embodiment) which relate to N (N is a natural number equal to or greater than 2) search regions, respectively, which are obtained by dividing an entire search region (which may be a portion or the whole of a search frame) are input from the control section 10 to the parameter setting section 30. The motion vector detection section 20 is activated by the control section 10 and receives an object frame and a search frame from the outside and a parameter which relates to one search region from the parameter setting section 30. Then, the motion vector detection section 20 calculates a motion vector and an evaluation value for a single search region based on the received parameter, and outputs the motion vector and the evaluation value to the result storage section 40. The result storage section 40 stores the motion vector and the evaluation value calculated by the motion vector detection section 20. The control section 10 obtains the stored motion vector and the evaluation value from the result storage section 40, and a completion signal from the motion vector detection section 20. The evaluation value indicates the degree of correlation between the encoded object block in the object frame and a candidate block in a search region within an entire search region.

In the above description, for the purpose of illustration, the parameters relating to the N divided search regions are described to be input from the control section 10 to the parameter setting section 30. However, the parameters relating to the N divided search regions may alternatively be pre-stored in the parameter setting section 30. The result storage section 40 may output N motion vectors to the control section 10 after they are stored in the result storage section 40.

The operation of the motion vector detection device 100 will now be described with reference to the flow chart illustrated in FIG. 2A.

Step 1: The control section 10 sets the N parameters relating to the search regions (i.e., N search positions) to the parameter setting section 30.

Step 2: The control section 10 activates the motion vector detection section 20.

Step 3: The motion vector detection section 20 calculates a motion vector and an evaluation value for one search position, outputs the motion vector and the evaluation value to the result storage section 40, and completes the motion vector detection operation for the search position.

Step 4: Steps 2 and 3 are repeated N times.

Step 5: The control section 10 obtains the N sets of motion vectors and evaluation values from the result storage section 40.

Step 6: The control section 10 determines an optimal motion vector for the encoded object block based on the N sets of motion vectors and evaluation values.

Figure 3A:
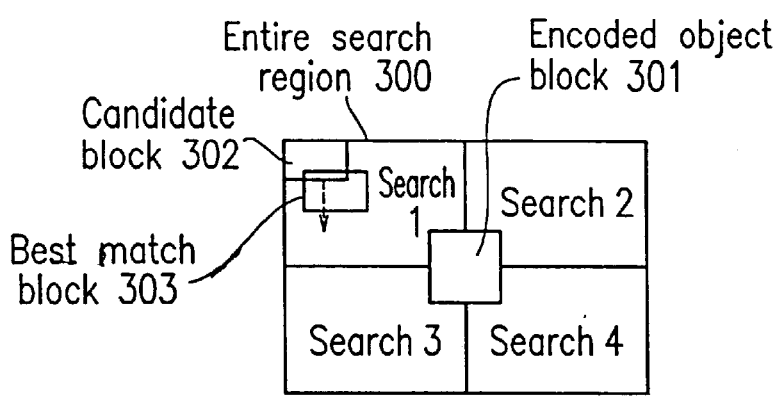
FIG. 3A illustrates an example of how an entire search region is divided into smaller search regions according to the present invention.

As a specific example, a search operation where an entire search region 300 is divided into four (N=4) search regions (designated respectively as "Search 1", "Search 2", "Search 3" and "Search 4" in FIG. 3A) will now be described with reference to FIG. 3A. In FIG. 3A, the entire search region 300 is divided into "Search 1", "Search 2", "Search 3" and "Search 4" which respectively correspond to the upper left, upper right, lower left and lower right regions of the entire search region 300. In the example shown in FIG. 3A, the search regions do not overlap with one another. A candidate block 302 of one search region does not have to be completely within the search region, but a portion thereof may extend beyond the boundary thereof. However, a portion of the candidate block 302 may not extend beyond the boundary to such an extent that the candidate block 302 would completely overlap with any other candidate block 302 extending from any other search region.

In the example shown in FIG. 3A, the entire search region 300 is divided into smaller rectangular search regions.

For example, where a motion vector detection operation is to be performed for each of the search regions (i.e., in FIG. 3A, the calculation and the storage of a motion vector and an evaluation value are to be performed four times), the motion vector detection device 100 is configured so that search positions for four search regions can be set in the parameter setting section 30 and four sets of motion vectors and evaluation values can be stored in the result storage section 40. The control section 10 writes the position of each search region (e.g., a set of coordinates representing the upper left corner of the search region) in the parameter setting section 30.

Specifically, four sets of coordinates respectively corresponding to the four search regions ("Search 1", "Search 2", "Search 3" and "Search 4") are set. Then, the control section 10 activates the motion vector detection section 20.

Upon the first activation, the motion vector detection section 20 calculates a motion vector and an evaluation value for "Search 1" in FIG. 3A, stores the motion vector and the evaluation value in the result storage section 40 as a first set of results, and returns a completion signal to the control section 10, thus completing the first motion vector detection operation.

Similarly, a motion vector and an evaluation value are calculated for "Search 2" and stored as a second set of results. This operation is similarly repeated for "Search 3" and "Search 4".

More specifically, each motion vector detection operation is performed as follows. First, the degree of correlation (i.e., the evaluation value) between an encoded object block 301 and the candidate block 302 in "Search 1" is obtained. Then, the candidate block 302 is shifted vertically or horizontally within "Search 1", and an evaluation value is obtained in a similar manner. By repeating such an operation, the best matching block within "Search 1" is determined as a block which exhibits the highest degree of correlation with respect to the encoded object block 301, based on which a motion vector and an evaluation value are calculated for "Search 1". By repeating such an operation for "Search 2" to "Search 4", a motion vector and an evaluation value are calculated for each of the four search regions.

After the motion vector detection section 20 have performed the four motion vector detection operations respectively for the four search regions, the control section 10 obtains the calculation results stored in the result storage section 40. Then, the control section 10 selects one of the four motion vectors as the motion vector for the current encoded object block based on the evaluation values. Thus, a motion vector optimal for the encoded object block is determined. Since an evaluation value is typically calculated by accumulating the value of difference (or the square thereof) between each pixel in the encoded object block and the corresponding pixel in the candidate block, the motion vector for which the evaluation value is smallest is typically selected.

As described above, in the present embodiment, the entire search region is divided into four search regions, and a single motion vector detection section is used to obtain respective motion vectors for the four search regions. Thus, it is possible to detect motion vectors over a large search region, thereby precisely selecting a motion vector, despite a small circuit scale.

While the number (N) of search regions into which an entire search region is divided is set to 4 in the present embodiment, N can be any natural number equal to or greater than 2.

In the present embodiment, the motion vector detection operation is performed to cover the whole of each of the N (=4 in the present example) search regions, thereby covering the whole of the entire search region. Alternatively, the entire search region may have a portion which does not belong to any of the N search regions. In such a case, it may be possible to reduce the amount of time spent for the search operation, which may be performed only for a part of the entire search region.

Figure 2A:
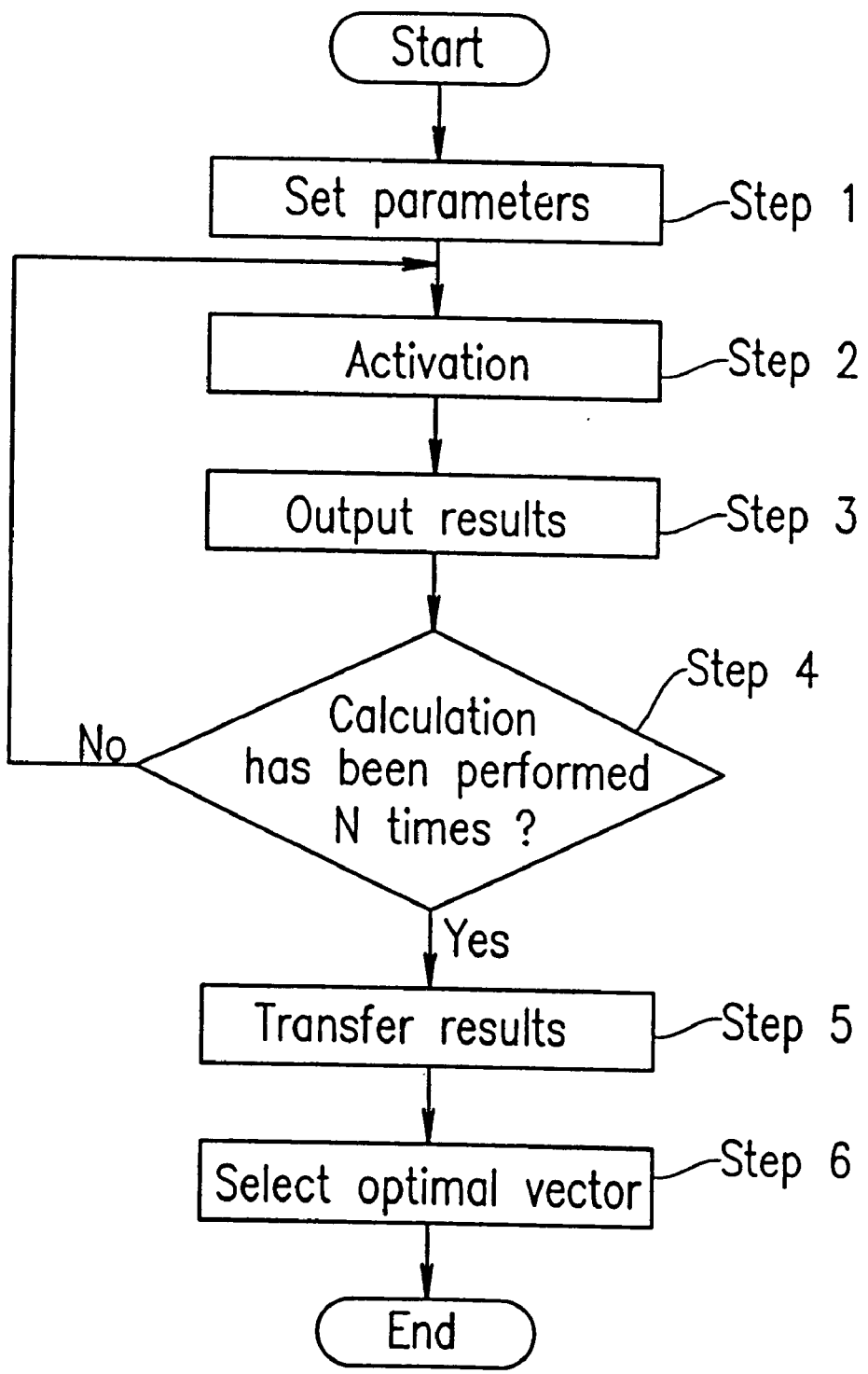
FIG. 2A is a flow chart illustrating an operation of the present invention.
Figure 2B:
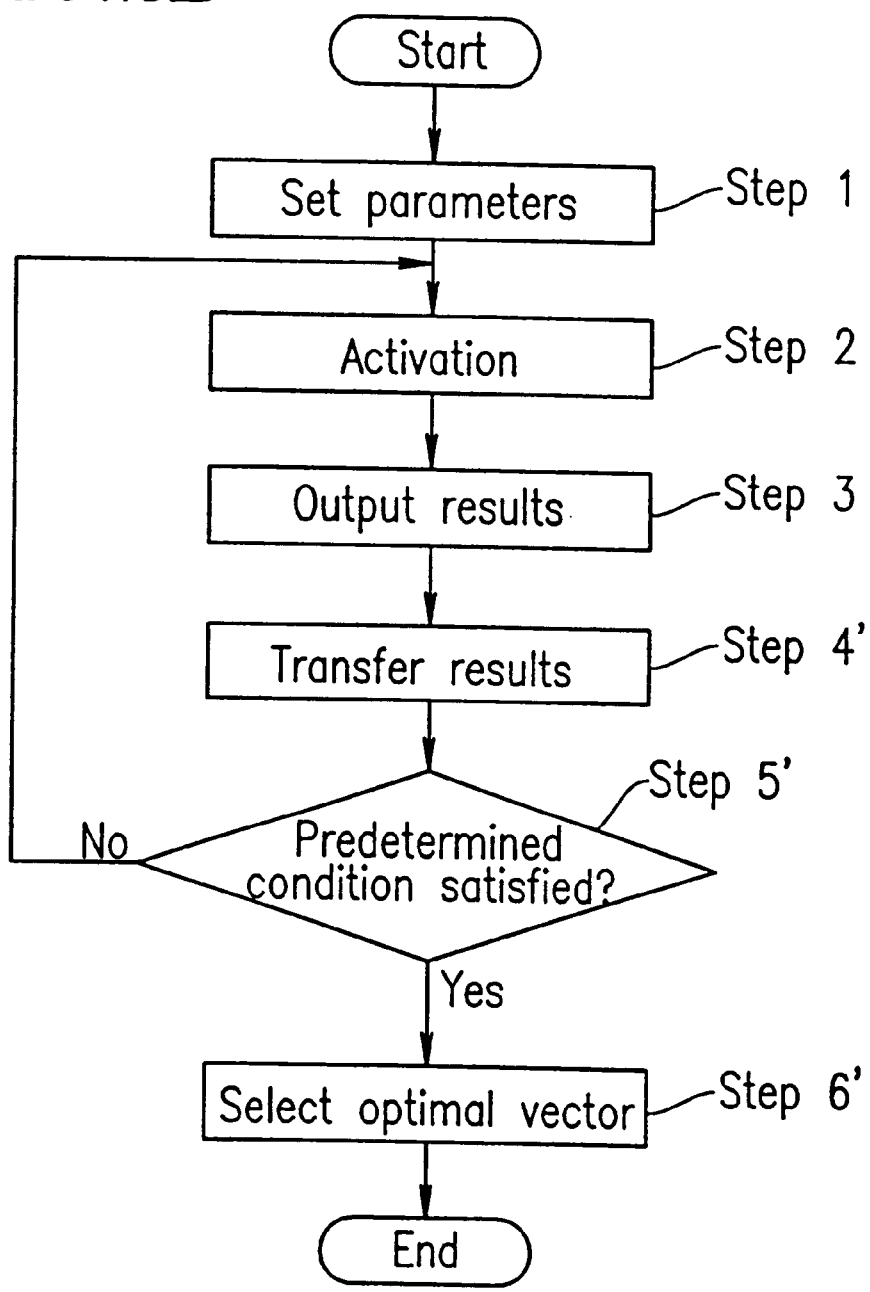
FIG. 2B is a flow chart illustrating another operation of the present invention.

For example, as illustrated in the flow chart of FIG. 2B, the following steps (Step 4' to Step 6') may be performed instead of Step 4 to Step 6 described above in connection with the operation shown in the flow chart of FIG. 2A.

Step 4': Output the calculated motion vector and evaluation value for a search region from the result storage section 40 to the control section 10.

Step 5': The control section 10 determines whether the evaluation value for the parameter of one search region satisfies a predetermined condition. If not, Step 2 to Step 5' are repeated.

Step 6': The control section 10 determines the optimal motion vector for the encoded object block based on the calculated motion vector and the evaluation value.

When the predetermined condition is satisfied, e.g., when an evaluation value is smaller than a predetermined value, the motion vector corresponding to the evaluation value is determined as the optimal motion vector. The motion vector detection section 20 does not have to search through all the N search regions, but is only required to continue to perform the motion vector detection operation until the predetermined condition is satisfied, which may be, for example, when M ($1 \leq M \leq N$) motion vectors have been calculated. When the evaluation value is greater than the predetermined value, the control section 10 instructs the motion vector detection section 20 to calculate the motion vector and the evaluation value for another search region parameter.

The predetermined condition may alternatively be modified so that the motion vector detection operation is continued for a predetermined period of time under the control of a timer, or the like, to obtain M motion vectors, among which the optimal motion vector is to be selected.

In the present embodiment, the number of repetitions is counted by the control section 10. Alternatively, a counter section for counting the number of repetitions can be provided in the motion vector detection section which returns a completion signal to the control section 10 when the motion vector detection operation has been repeated N times. In such a case, the result storage section 40 may output the optimal motion vector to the control section 10 after determining the optimal motion vector based on the N evaluation values.

In the present embodiment, the N sets of parameters are set initially. Alternatively, a pair of the parameter setting section 30 and the result storage section 40 may be provided in each motion vector detection section 20 so that the parameter setting operation, the motion vector detection operation, the output result obtaining operation may be performed N times for each of the divided search regions.

Figure 1B:
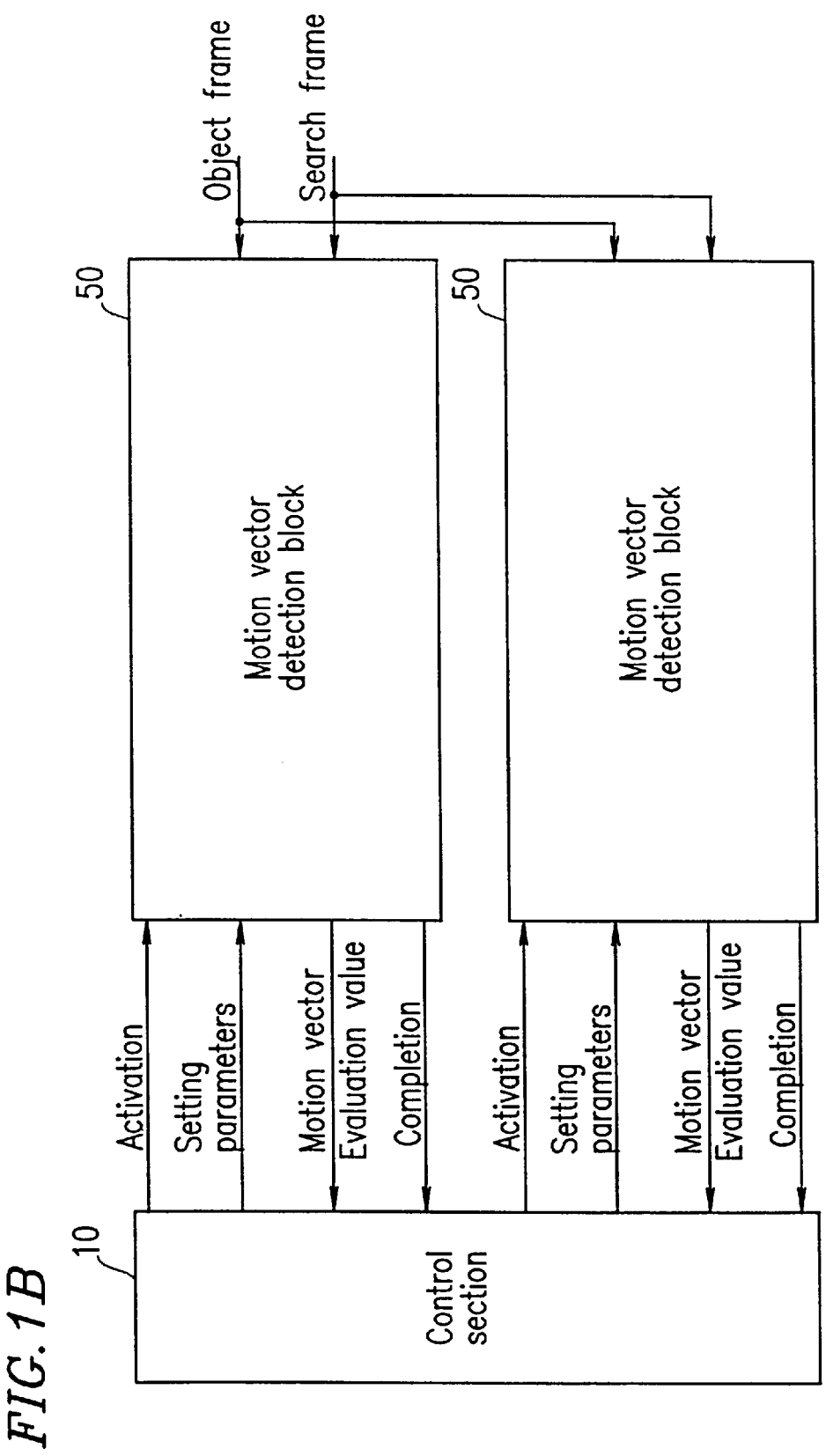
FIG. 1B is a schematic diagram illustrating an alternative arrangement using a plurality of motion vector detection blocks.

A specific example of such an alternative embodiment is illustrated in FIG. 1B, in which two motion vector detection blocks 50 are provided. Each motion vector detection block 50 includes the motion vector detection section 20, the parameter setting section 30 and the result storage section 40, as shown in the broken line box in FIG. 1A. The control section 10 controls the two motion vector detection blocks 50 so as to obtain motion vectors and evaluation values respectively for different search regions, each in a manner as described above. In this way, it is possible to quickly search through the entire search region for the optimal motion vector for the encoded object block.

With the configuration illustrated in FIG. 1B, the control section 10 may alternatively control the two motion vector detection blocks 50 so as to detect optimal motion vectors for different encoded object blocks, respectively. By simultaneously calculating the optimal motion vectors for different encoded object blocks within the object frame, it is possible to quickly detect motion vectors between the object frame and the entire search frame.

In the example shown in FIG. 1B, the parameter setting section 30 and the result storage section 40 are provided in a motion vector detection block 50. Alternatively, the control section 10 may include the parameter setting section 30 and the result storage section 40.

Figure 3B:
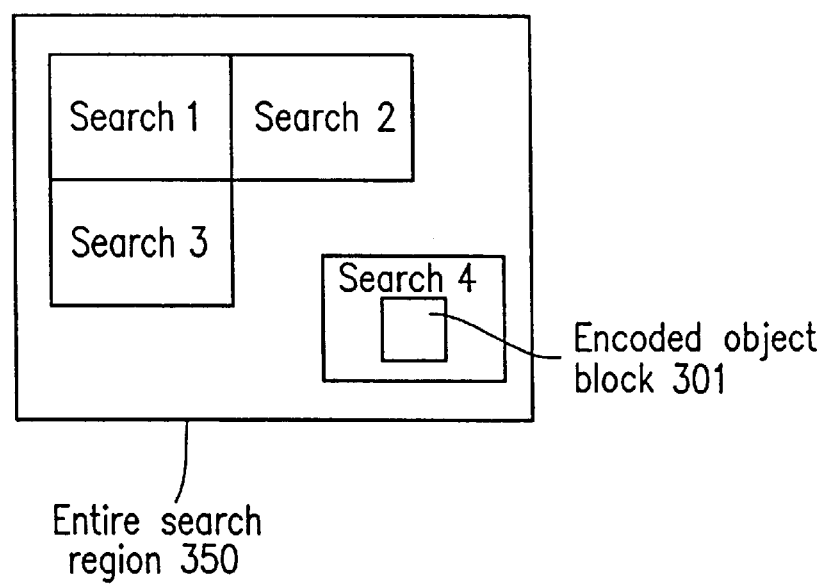
FIG. 3B illustrates an alternative example of how an entire search region is divided into smaller search regions according to the present invention.

In the example shown in FIG. 3A, the whole of the entire search region 300 is divided into N (=4 in the present example) search regions. However, the present invention is not limited to such an arrangement. For example, referring to FIG. 3B, an entire search region 350 includes N (=4 in the present example) search regions which together do not account for the entire area of the entire search region 350. Thus, the entire search region 350 includes one or more portions which do not belong to any of the N (=4 in the present example) search regions. Moreover, a search region does not have to abut on another search region (e.g., "Search 1" and "Search 4" in FIG. 3B are separated from each other). In such cases, it may be possible to determine the optimal motion vector in a reduced amount of time by selectively arranging the search regions in locations where the optimal motion vector is likely to be detected.

In the example shown in FIG. 3A, the center of the encoded object block 301 in the object frame coincides with the center of the entire search region 300. Where such an arrangement is used to determine the optimal motion vector after calculating the respective motion vectors for all of the search regions, the motion vector detection operation is performed uniformly across the entire search region. However, the center of the encoded object block 301 in the object frame does not have to coincide with the center of the entire search region 300. For example, it may be possible to determine the optimal motion vector in a reduced amount of time by arranging the search regions as shown in FIG. 3B ("Search 1", "Search 2" and "Search 3" being arranged together in a location away from the encoded object block 301 toward the upper left corner of the entire search region 350, with "Search 4" being generally centered around the encoded object block 301) if there is expected to be a large motion vector pointing generally toward the upper left corner of the entire search region 350.

Embodiment 2

Figure 4:
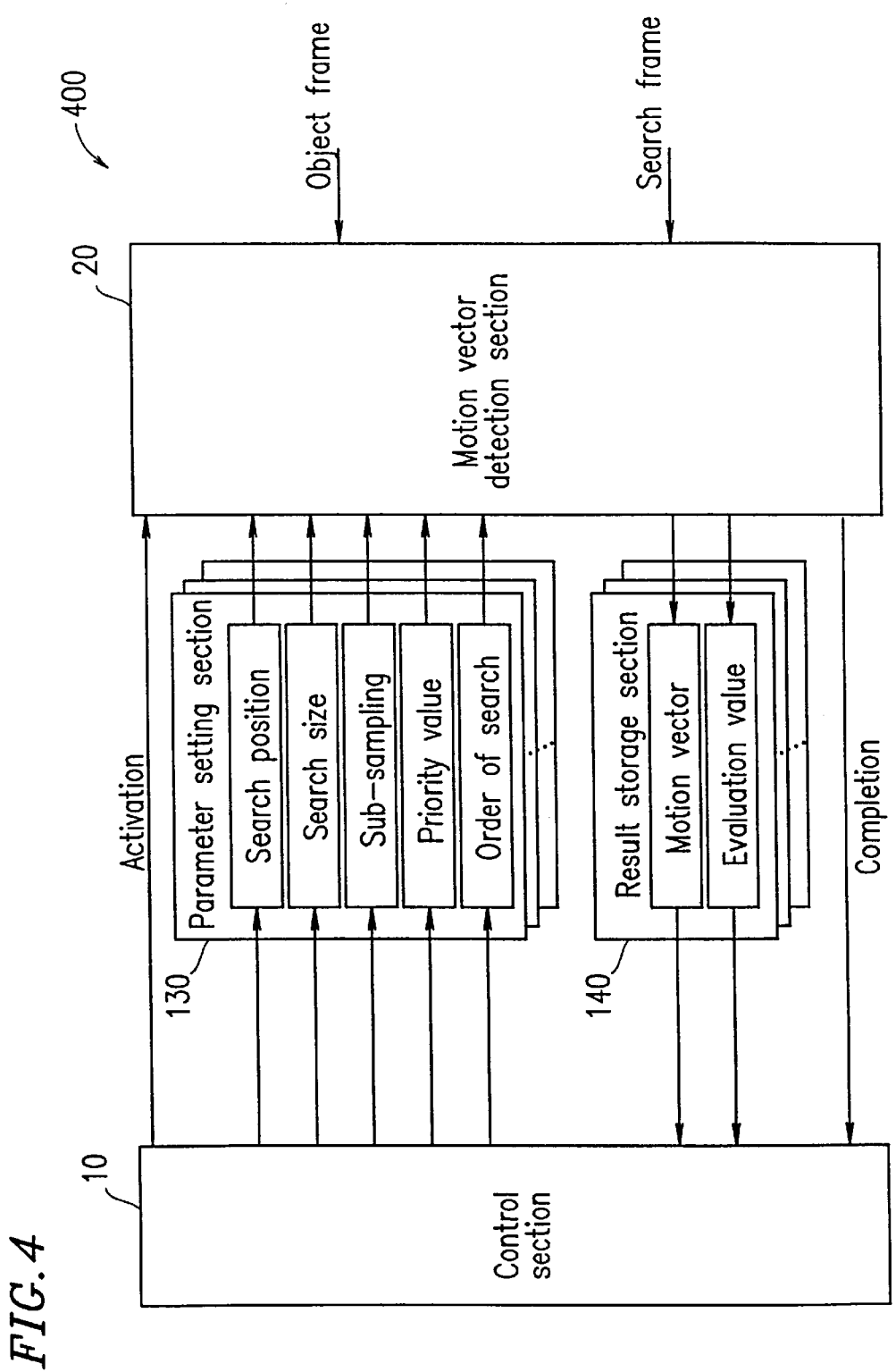
FIG. 4 is a schematic diagram illustrating another motion vector detection device of the present invention.

FIG. 4 illustrates a motion vector detection device 400 according to Embodiment 2 of the present invention.

Referring to FIG. 4, the motion vector detection device 400 includes the control section 10, the motion vector detection section 20, a parameter setting section 130 and a result storage section 140. The parameter setting section 130 input various parameters relating to the search region to the motion vector detection section 20. In the present embodiment, the various parameters include search position, search size (the size or area of a search region), sub-sampling, priority and order of search. Each of these parameters will be defined or otherwise particularly described below. The result storage section 140 stores the motion vectors and the evaluation values calculated by the motion vector detection section 20. Otherwise, the present embodiment is the same as Embodiment 1. The parameters relating to the search region may include only one or more of search position, search size, sub-sampling, priority and order of search.

The "sub-sampling" as used herein refers to a decimated sampling operation, where only one out of a number of rows or columns of pixels is sampled (or searched) while skipping the other rows or columns of pixels. Thus, the sub-sampling parameter indicates the degree and the direction of decimation.

The "priority" as used herein refers to a parameter indicating a predetermined value which is added to or multiplied by the evaluation value calculated based on the search region in order to determine the optimal motion vector.

The "order of search" as used herein refers to the order in which the various search regions within the entire search region 500 are searched. Typically, the various search regions are arranged so that a search region in which the optimal motion vector is more likely to be found is given an earlier order.

The operation of the motion vector detection device 400 is substantially the same as the operation of the motion vector detection device 100 as described above with reference to the flow chart of FIG. 2A, except that the parameters used in Step 1 include search size, sub-sampling, priority and order of search in addition to search position.

A specific search operation where an entire search region 500 is divided into 9 search regions (N=9) will now be described with reference to FIG. 5A.

The motion vector calculation is performed 9 times. Accordingly, 9 sets of parameters are set in the parameter setting section 130, and the result storage section 140 is configured to be able to store 9 sets of motion vectors and evaluation values. The control section 10 writes each of the search position parameter, the search size parameter, the sub-sampling parameter and the order of search parameter into the parameter setting section 130.

In FIG. 5A, the entire search region 500 is divided into search regions of various sizes ("Search A", "Search B", "Search C", "Search D", "Search E", "Search F", "Search G", "Search H" and "Search I). A search position, a search size, a sub-sampling parameter, a priority and an order of search are set for each of the search regions as parameters relating to the search region.

For "Search A" in FIG. 5A, the search position parameter is "center" of the entire search region 500, the search size parameter is "small", and the sub-sampling parameter is "none". The search size is larger and more sub-sampling is performed for search regions farther away from the center of the entire search region 500.

The reason why "more sub-sampling is performed for search regions farther away from the center of the entire search region 500" is based on the visual characteristics of human eyes that human eyes have lower resolutions for objects that are moving at a higher speed.

When the motion vector is large, there is an object moving at a high speed (for which human eyes have a low resolution). Therefore, the optimal motion vector (or an estimated position of the object block) is found in a search region that is far away from the center of the entire search region. Thus, in a search region far away from the center of the entire search region 500, one can use a coarse motion vector detection resolution by "sub-sampling" (or "decimating") the pixels in the search region and still obtain a satisfactory result. Therefore, the farther the search position is from the center of the entire search region 500, the more sub-sampling can be performed.

The reason why "the search size is larger for search regions farther away from the center of the entire search region 500" is as follows. In search regions farther away from the center of the entire search region 500, more sub-sampling is performed as described above, thereby reducing the amount of calculation. Accordingly, the search size can be increased so as to perform a search operation over a larger area. In such search regions, it is preferred to increase the search size.

In the example shown in FIG. 5A, the entire search region 500 includes 112 (±48) pixels horizontally and 80 (±32) pixels vertically. FIG. 5A also shows an exemplary parameter setting for the entire search region 500. In this example, the search position for each search region is represented by a set of coordinates corresponding to the upper left corner of the search region.

In "Search B" and "Search C", sub-sampling is performed in the horizontal direction because "Search B" and "Search C" are horizontally arranged with respect to the center of the entire search region. Similarly, in "Search D" and "Search E", sub-sampling is performed in the vertical direction because "Search D" and "Search E" are vertically arranged with respect to the center of the entire search region. In "Search F", "Search G", "Search H" and "Search I", sub-sampling is performed both in the horizontal and vertical directions.

The parameter setting may vary from an encoded object block to another. For example, when the previous motion vector of the encoded object block has a large magnitude, the search size of a search region far away from the center of the entire search region 500 can be increased so as to further reduce the motion vector detection resolution. Alternatively, the search region may be positioned farther away from the center of the entire search region 500.

After setting the 9 parameters as described above, the control section 10 activates the motion vector detection section 20. Upon the first activation, the motion vector detection section 20 calculates a motion vector and an evaluation value for "Search A" in FIG. 5A, stores the motion vector and the evaluation value in the result storage section 140 as a first set of results, and returns a completion signal to the control section 10, thus completing the first motion vector detection operation.

Similarly, a motion vector and an evaluation value are calculated for "Search B" and stored as a second set of results in the result storage section 140. This operation is similarly repeated for "Search C" to "Search I".

After the motion vector detection section 20 has performed the 9 motion vector detection operations respectively for the 9 search regions, the control section 10 obtains the calculation results stored in the result storage section 140. Then, the control section 10 selects one of the 9 motion vectors as the motion vector for the current encoded object block based on the evaluation values. Since an evaluation value is typically calculated by accumulating the value of difference (or the square thereof) between each pixel in the encoded object block and the corresponding pixel in the candidate block, the motion vector for which the evaluation value is smallest is typically selected.

As described above in Embodiment 1 with reference to FIG. 2B, if a predetermined condition is satisfied, the motion vector calculation does not have to be repeated N (=9) times, and M ($1 \leq M \leq N$) repetitions may instead be sufficient. The predetermined condition may be as described above. For example, the motion vector detection operation may be continued until the evaluation value is smaller than a predetermined value, or the motion vector detection operation may be continued for a predetermined period of time under the control of a timer, or the like.

As in the example shown in FIG. 5A, each search region can be given a priority so that a search region having a higher priority is preferentially selected. The reason why each search region is given a priority is that a large motion vector requires a large amount of code for the motion vector itself, thereby adversely affecting the compression rate.

For example, in the example shown in FIG. 5A, the various search regions are provided with priorities which indicate values (priority values) ranging from "1" (highest priority) to "4" (lowest priority). Thus, the control section 10 can select the motion vector of one of the search regions as the motion vector of the current encoded object block based on corrected evaluation values obtained by adding the respective priority values to the evaluation values of the corresponding search regions.

In the entire search region 500 shown in FIG. 5A, "Search B" and "Search C", which are horizontally abutting on "Search A", are given a priority that is higher than that of "Search D" and "Search E" which are vertically abutting on "Search A". Typically, an image display device has a horizontal dimension that is greater than its vertical dimension so that a motion vector is likely to have a larger magnitude component along the horizontal direction. Therefore, a search region horizontally arranged with respect to the center of the entire search region preferably has a priority that is higher than that of a search region vertically arranged with respect to the center of the entire search region.

Moreover, in order to save an amount of time for calculating motion vectors, the motion vector detection operation can be omitted for the corner search regions ("Search F", "Search G", "Search H" and "Search I" in FIG. 5A).

Similarly, each search region can be provided with an order of search in the present embodiment. For example, when the motion vector calculation is terminated when the evaluation value of a search region is smaller than a predetermined value, as described above with reference to FIG. 2B, it is preferred to start the search operation with a search region in which the optimal motion vector is likely to be found so as to reduce the search time. Then, even if the operation of the motion vector detection device 400 is stopped in the middle of a search operation for some reason, it is more likely that the optimal motion vector has already been found because the search operation is started from a search region in which the optimal motion vector is likely to be found. Although the priority value coincides with the order of search for each search region in the example shown in FIG. 5A, it is understood that the present invention is not limited to this.

As described above, according to the present embodiment, the motion vector detection operation is performed after suitable parameters (search position, search size, sub-sampling, priority and order of search) are set for each of a plurality of search regions. Thus, based on the various parameter settings, the present embodiment enables an optimal motion vector selection over a large search region with a small circuit scale.

Particularly, the present embodiment enables one to provide each search region with a priority of selection by setting a priority indicating a value which is added to or multiplied by the evaluation value for that search region.

While the number (N) of search regions into which the entire search region 500 is divided is set to 9 in the present embodiment, N may alternatively any other natural number equal to or greater than 2.

Figure 5B:
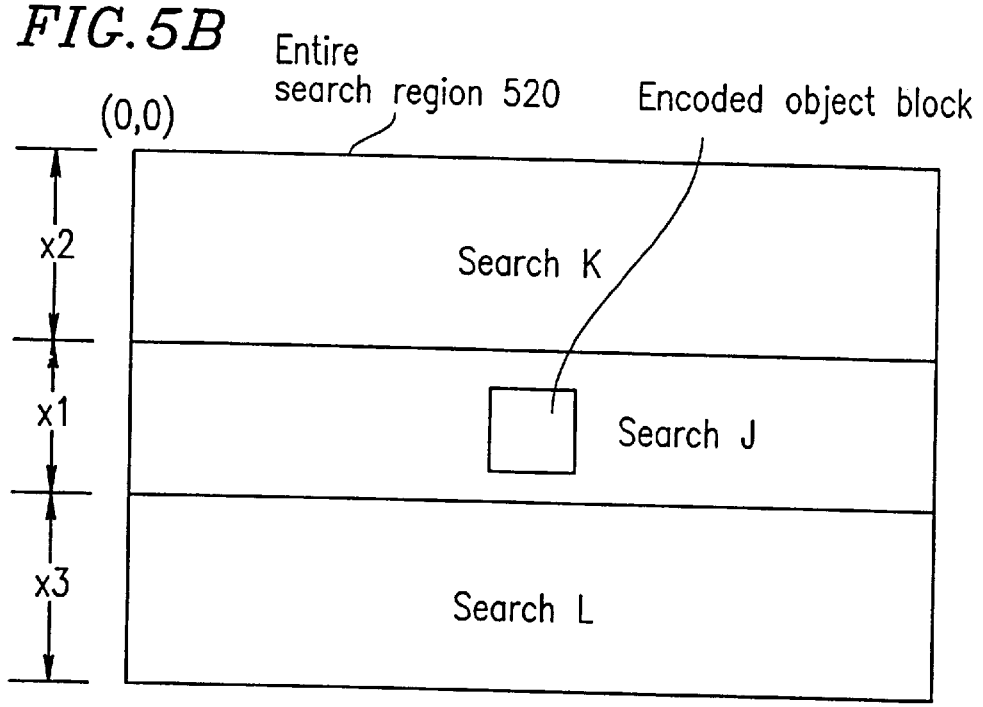
FIG. 5B illustrates an alternative example of how an entire search region is divided into smaller search regions along the horizontal direction according to the present invention.

For example, FIG. 5B shows an alternative example where an entire search region 520 is divided into three horizontally extending search regions ("Search J", "Search K" and "Search L"). In such a case, it is preferred that a width x1 of "Search J" is smaller than widths x2 and x3 of "Search K" and "Search L", respectively. In view of the visual characteristics of human eyes and the circuit scale, it is appropriate to perform the motion vector detection with a smaller search size and a finer resolution for a search region including the center of the entire search region. This is because human eyes have a higher resolution for an object that is stationary or moving at a low speed (i.e., an object with a small motion vector).

Figure 5C:
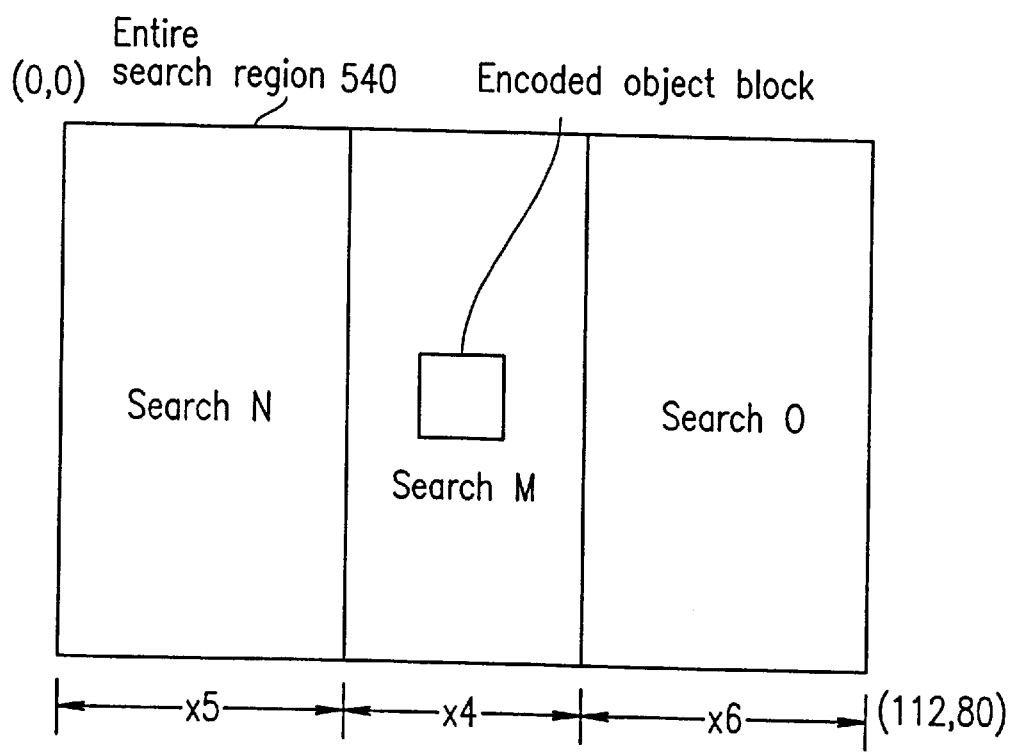
FIG. 5C illustrates an alternative example of how an entire search region is divided into smaller search regions along the vertical direction according to the present invention.

Similarly, FIG. 5C shows another alternative example where an entire search region 540 is divided into three vertically extending search regions ("Search M", "Search N" and "Search O"). For the same reasons as described above, a width x4 of "Search M" is preferably smaller than widths x5 and x6 of "Search N" and "Search O", respectively.

In the present embodiment, the search operation is performed with a finer resolution for the center of the entire search region. Alternatively, other search regions may be searched with a finer resolution depending upon the results obtained for surrounding encoded object blocks, information on the previous motion vector, or external information such as the movement of the camera.

In the present embodiment, the center search region has the smallest search size. Alternatively, the size of the search region to be searched with a fine resolution can be changed depending upon predictable image characteristic information.

In the present embodiment, there is only one search region that is to be searched with a fine resolution. Alternatively, when it is predicted in advance that there are a plurality of search regions where the optimal motion vector is likely to be found, a plurality of search regions may be searched with a fine resolution.

Figure 5D:
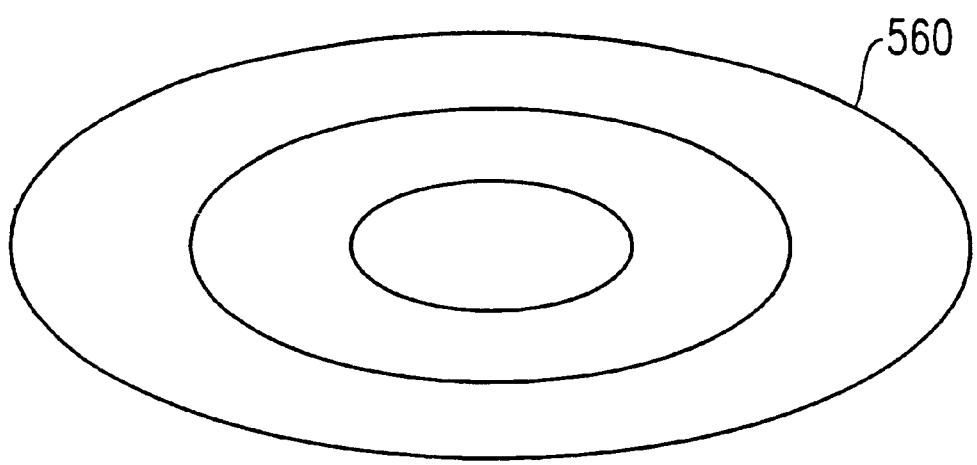
FIG. 5D illustrates an alternative example of how an entire search region is divided into smaller elliptical search regions according to the present invention.

Although the entire search region is divided into smaller rectangular search regions in the above description, the present invention is not limited to this. Ideally, an entire search region is divided into smaller elliptical regions. FIG. 5D shows an example where an entire search region is divided into smaller elliptical regions (e.g., 560).

The aspect ratio of a display screen is 4:3 for standard display screens such as NTSC type display screens and 16:9 for high definition type display screens. In either case, a display screen has a horizontal dimension that is greater than its vertical dimension. Therefore, the movement of an object within a picture or the movement of the entire picture tends to be greater in the horizontal direction than in the vertical direction. Thus, an elliptical search region as shown in FIG. 5D is ideal. Again, in view of the visual characteristics of human eyes and the circuit scale, it is appropriate to perform the motion vector detection with a smaller search size and a finer resolution for the center of the entire search region and with a large search size and a coarser resolution for search regions farther away from the center of the entire search region.

However, it is difficult to implement a motion vector detection operation with an elliptical search region, and it is more practical to approximate an elliptical search region with rectangular search regions. For example, where an entire search region is divided into 9 rectangular search regions (as in the example shown in FIG. 5A), the four corner search regions may be eliminated or reduced in size.

Figure 5E:
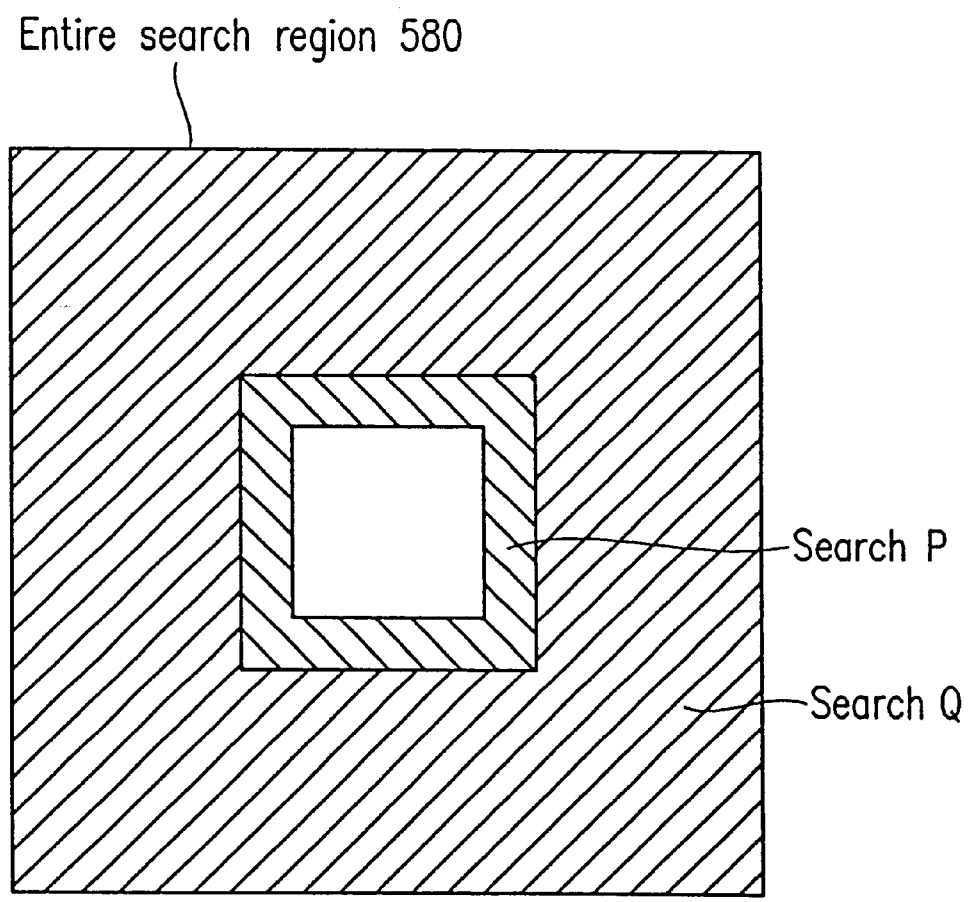
FIG. 5E illustrates an alternative example of how an entire search region is divided into smaller search regions according to the present invention, in which any smaller search region is included by a larger search region.

As an alternative example to an elliptical search region as shown in FIG. 5D, FIG. 5E shows an example where an entire search region 580 is divided into smaller "Search P" and larger "Search Q" so that "Search P" is surrounded by "Search Q". In such a case, "Search P" closer to the center of the entire search region 580 may be searched with a smaller search size and a finer search resolution with no sub-sampling, whereas "Search Q" farther away from the center of the entire search region 580 may be searched with a larger search size and a coarser search resolution with sub-sampling.

Embodiment 3

Figure 6:
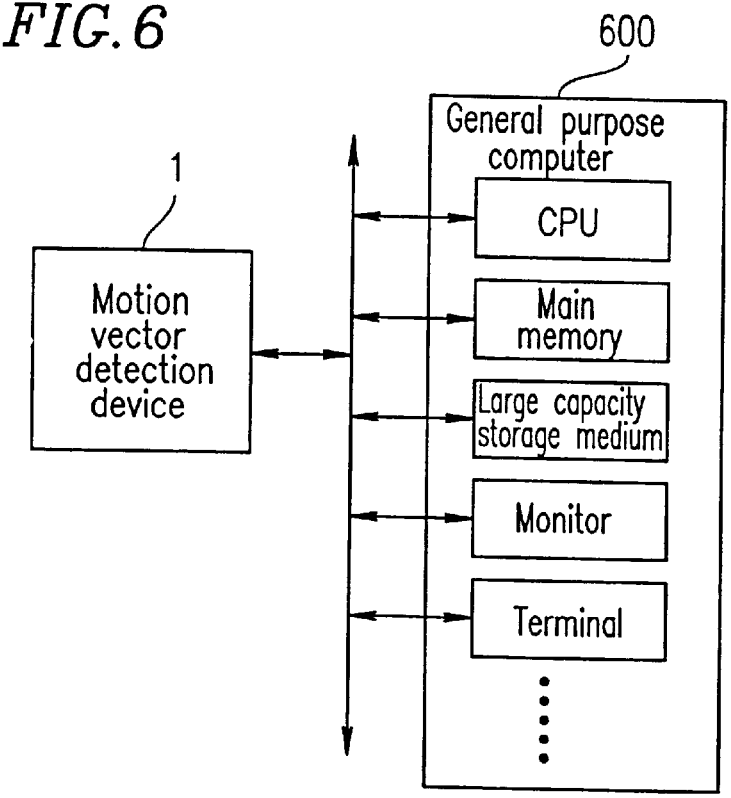
FIG. 6 is a schematic diagram illustrating a motion vector detection circuit of the present invention and a general-purpose computer.
Figure 7:
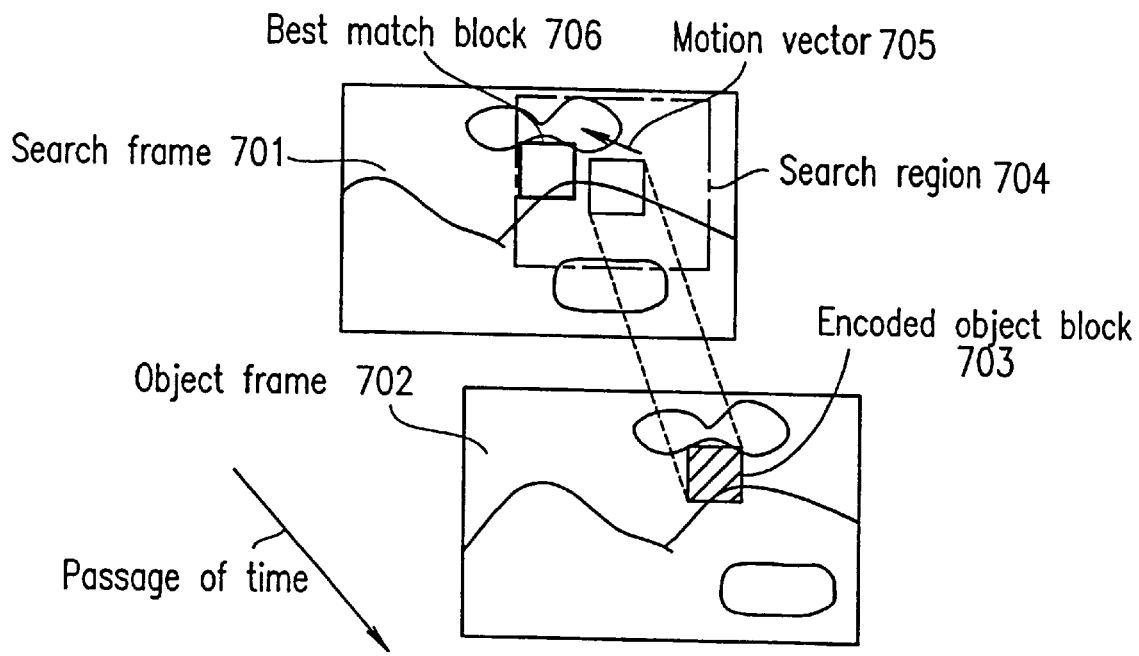
FIG. 7 illustrates a block matching method.
Figure 8:
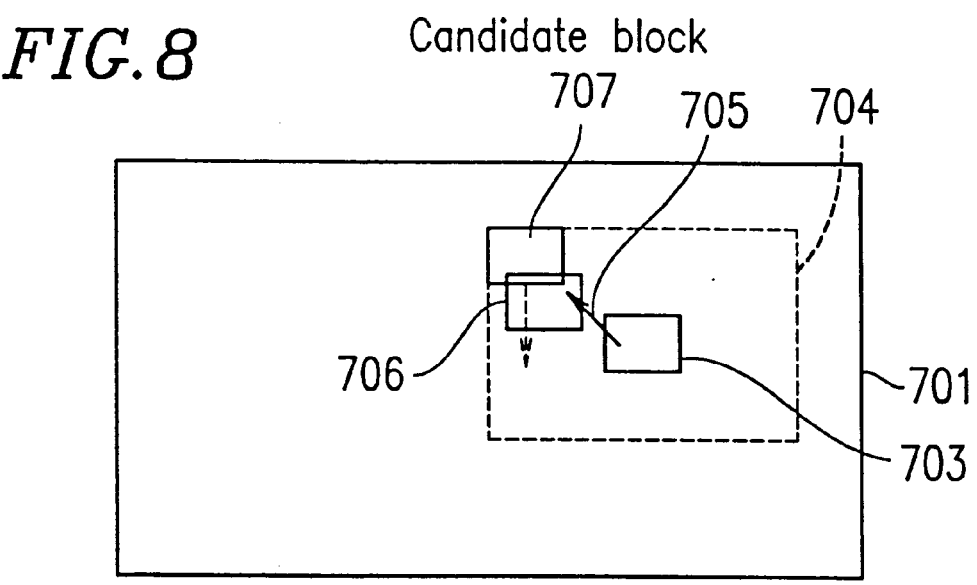
FIG. 8 illustrates an enlarged version of a search frame.
Figure 9:
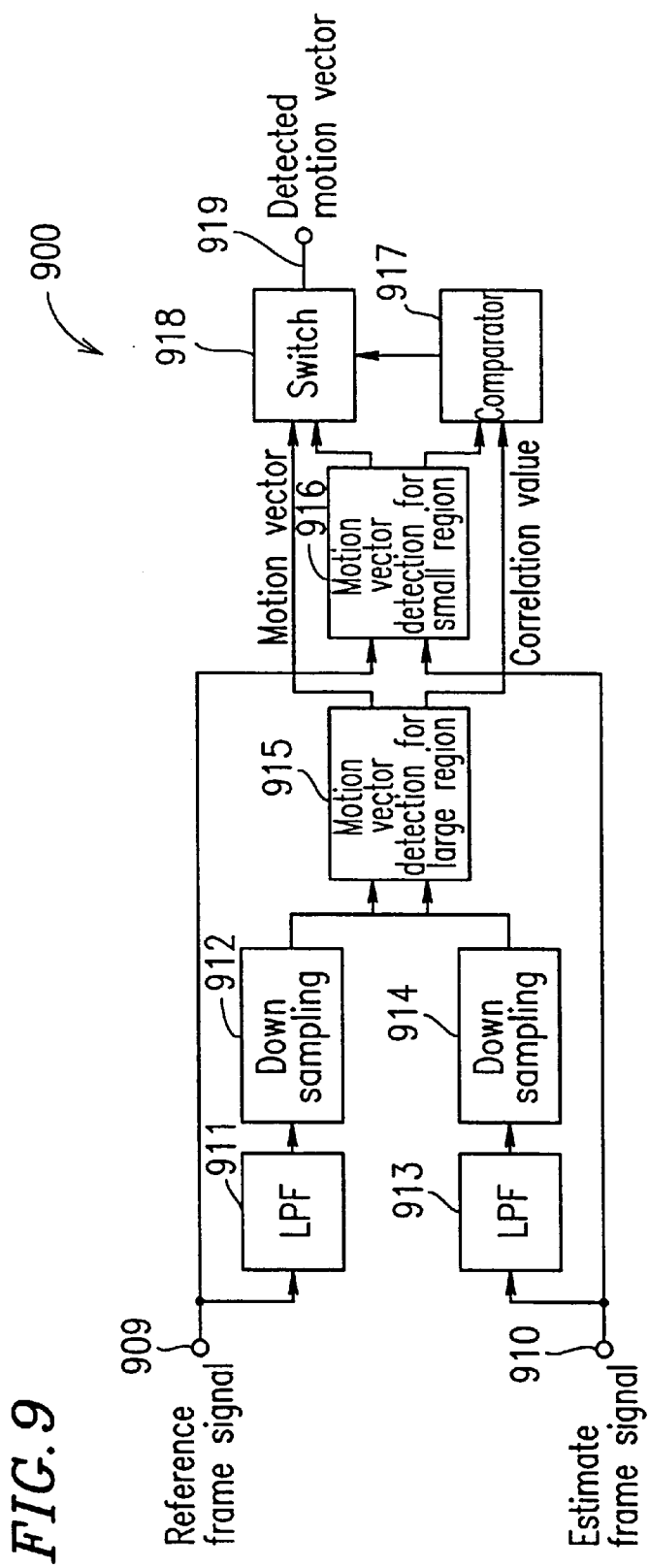
FIG. 9 illustrates a conventional motion vector detection circuit.

FIG. 6 illustrates Embodiment 3 of the present invention. Referring to FIG. 6, a motion vector detection device 1 of the present invention is connected to a general purpose computer 600 via a main bus, and the general purpose computer 600 includes a CPU, a main memory, a large capacity storage medium, a monitor, a terminal, and the like.

The operation of the present embodiment will now be described. Picture data including search frames and object frames is stored in the large capacity storage medium. In response to an instruction from the motion vector detection device 1, information relating to a necessary search frame and an object frame is read out from the large capacity storage medium via the main bus.

In such a case, the frequency of use of the main bus is uncertain because the general purpose computer 600 uses the main bus for exchange of data to/from the various devices. On the other hand, the amount of transfer of search frames and object frames which is requested by the motion vector detection device 1 is generally fixed and requires data transfer rate of about a few Gbps.

Therefore, depending upon the status of use of the general purpose computer 600, information relating to necessary search regions may or may not be transferred within an acceptable amount of time. When the transfer cannot be made within the acceptable amount of time, the motion vector detection process slows down and all of the N sets of parameters as used in Embodiment 1 or 2 may not be processed.

However, according to the present invention, the entire search region is divided into a plurality of search regions and the various parameters are set in the parameter setting section so that the motion vector detection operation is started from a search region where the optimal motion vector is likely to be found. Therefore, even when the processing time is insufficient and the search operation has to be discontinued, an effective motion vector having a desirable evaluation value is likely to be detected.

In the above-described embodiment, the order of search parameter is set in the parameter setting section. Alternatively, an order-of-search storage section may be provided for storing a predetermined order of search so that the search operation can be performed in the predetermined order.

As described above, according to the present invention, the entire search region is divided into a predetermined number of search regions, and respective motion vectors are calculated for the search regions, after which the optimal motion vector can be selected. Thus, it is possible to accurately select the optimal motion vector over a large search region with a small circuit scale.

According to the present invention, the motion vector detection operation is repeated a plurality of times for different parameters, i.e., search position, search size, sub-sampling, priority and order of search, after which the optimal motion vector can be selected. Thus, it is possible to accurately select the optimal motion vector over a large search region with a small circuit scale by using various settings in view of the characteristics of the picture.

Moreover, the present invention enables one to provide each search region with a priority of selection by setting a priority indicating a value which is added to or multiplied by the evaluation value for that search region.

Furthermore, the present invention allows one to start the search operation from a search region where the optimal motion vector is likely to be found. Therefore, even when the motion vector detection operation has to be discontinued without finishing the motion vector detection operation for all the search positions which are set in the parameter setting section, it is possible to improve the possibility that an effective motion vector is detected.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A motion vector detection device, comprising:
   a parameter setting -section having parameters relating to N (N is a natural number equal to or greater than 2) search regions obtained by dividing at least a portion of an entire search region in a search frame;
   a motion vector detection section for calculating an evaluation value which indicates a degree of correlation between an encoded object block in an object frame and a candidate block in one of the N search regions and for calculating a motion vector based on the evaluation value;
   a result storage section for storing the motion vector and the evaluation value calculated by the motion vector detection section; and
   a control section for controlling the motion vector detection section to calculate motion vectors and evaluation values for M ($1 \leq M \leq N$) different ones of the N search regions until a predetermined condition is satisfied, for receiving the motion vectors and the evaluation values from the result storage section, and for determining the motion vector for the encoded object block.

2. A motion vector detection device according to claim 1, wherein the control section inputs parameters relating to the N search regions to the parameter setting section.

3. A motion vector detection device according to claim 1, wherein M is equal to N.

4. A motion vector detection device according to claim 3, wherein the result storage section stores N motion vectors and N evaluation values and then outputs the evaluation values and the motion vectors to the control section.

5. A motion vector detection device according to claim 1, wherein the parameters relating to each search region include search position which indicates a position of a search region.

6. A motion vector detection device according to claim 1, wherein the parameters relating to each search region include search size which indicates a size of a search region.

7. A motion vector detection device according to claim 1, wherein the parameters relating to each search region include sub-sampling which indicates a degree and a direction of decimation in the search region.

8. A motion vector detection device according to claim 1, wherein the parameters relating to each search region include a priority which indicates a predetermined value to be added to or multiplied by the evaluation value.

9. A motion vector detection device according to claim 8, wherein a search region horizontally shifted from a center of the entire search region has a priority higher than that of a search region vertically shifted from the center of the entire search region.

10. A motion vector detection device according to claim 1, wherein the parameters relating to each search region include order of search which indicates an order in which the calculation of the motion vector and the evaluation value is performed.

11. A motion vector detection device according to claim 10, wherein a search region horizontally shifted from a center of the entire search region has an order of search higher than that of a search region vertically shifted from the center of the entire search region.

12. A motion vector detection device according to claim 1, wherein the parameters relating to each search region include at least two of search position, search size, sub-sampling, priority and order of search.

13. A motion vector detection device according to claim 1, wherein the predetermined condition is that the evaluation value being smaller than a predetermined value which the control section has.

14. A motion vector detection device according to claim 1, wherein the predetermined condition is limited by a predetermined amount of time.

15. A motion vector detection device according to claim 1, wherein N is 2.

16. A motion vector detection device according to claim 1, wherein N is 3.

17. A motion vector detection device according to claim 1, wherein the at least a portion of the entire search region is divided only along the vertical direction.

18. A motion vector detection device according to claim 1, wherein the at least a portion of the entire search region is divided only along the horizontal direction.

19. A motion vector detection device according to claim 1, wherein the at least a portion of the entire search region is divided into elliptical search regions.

20. A motion vector detection device according to claim 19, wherein each of the elliptical search regions is longer in the horizontal direction than in the vertical direction.

21. A motion vector detection device according to claim 1, wherein the at least a portion of the entire search region is divided into rectangular search regions.

22. A motion vector detection device according to claim 1, wherein the N search regions are such that no candidate block included in one of the N search regions has a complete overlap with another candidate block which is included in another one of the N search regions.

23. A motion vector detection device according to claim 6, wherein at least two of the N search regions have different search sizes.

24. A motion vector detection device according to claim 6, wherein at least two of the N search regions have different sizes, and a search region having a larger size surrounds a search region having a smaller size.

25. A motion vector detection device according to claim 23, wherein one of the N search regions including a center of the entire search region has the smallest size.

26. A motion vector detection device according to claim 23, wherein one or more of the N search regions along a periphery of the entire search region has the largest size.

27. A motion vector detection device according to claim 23, wherein the at least a portion of the entire search region is rectangular, and one or more of the N search regions at corners of the at least a portion of the entire search region has the largest size.

28. A motion vector detection device according to claim 8, wherein at least two of the N search regions have different priorities.

29. A motion vector detection device according to claim 28, wherein one of the N search regions including a center of the entire search region has the highest priority.

30. A motion vector detection device according to claim 28, wherein one or more of the N search regions along a periphery of the entire search region has the lowest priority.

31. A motion vector detection device according to claim 28, wherein the at least a portion of the entire search region is rectangular, and one or more of the N search regions at corners of the at least a portion of the entire search region has the lowest priority.

32. A motion vector detection device according to claim 7, wherein at least two of the N search regions have different sub-sampling parameters.

33. A motion vector detection device according to claim 32, wherein a search region vertically shifted from a center of the entire search region is sub-sampled in the vertical direction.

34. A motion vector detection device according to claim 32, wherein a search region horizontally shifted from a center of the entire search region is sub-sampled in the horizontal direction.

35. A motion vector detection device according to claim 32, wherein one or more of the N search regions along a periphery of the entire search region has the largest sub-sampling parameter.

36. A motion vector detection device according to claim 32, wherein the at least a portion of the entire search region is rectangular, and one or more of the N search regions at corners of the at least a portion of the entire search region has the largest sub-sampling parameter.

37. A motion vector detection method, comprising:

an input step of inputting parameters relating to N (N is a natural number equal to or greater than 2) search regions obtained by dividing at least a portion of an entire search region in a search frame to a motion vector detection section;

a calculation step of calculating an evaluation value which indicates a degree of correlation between an encoded object block in an object frame and a candidate block in one of the N search regions based on the parameters of the one of the N search regions, and calculating a motion vector based on the evaluation value; and a determination step of determining whether a predetermined condition is satisfied based on the calculated evaluation values and motion vectors.

38. A motion vector detection method according to claim 37, further comprising the step of terminating the motion vector calculation when the predetermined condition is satisfied.

39. A motion vector detection method according to claim 37, further comprising the step of repeating the input step and the calculation step when the predetermined condition is not satisfied.

* * * * *